United States Patent
Ghoneim et al.

(10) Patent No.: US 6,169,951 B1
(45) Date of Patent: Jan. 2, 2001

(54) ACTIVE BRAKE CONTROL HAVING YAW RATE ESTIMATION

(75) Inventors: Youssef Ahmed Ghoneim, Macomb Township, Macomb County; Yuen-Kwok Chin, Troy, both of MI (US)

(73) Assignees: General Motors Corporation, Detroit; Delphi Technologies, Inc., Troy, both of MI (US)

( * ) Notice: Under 35 U.S.C. 154(b), the term of this patent shall be extended for 0 days.

(21) Appl. No.: 09/138,335

(22) Filed: Aug. 21, 1998

(51) Int. Cl.$^7$ ........................................ B60T 8/32
(52) U.S. Cl. ............................... 701/70; 701/82; 303/140
(58) Field of Search ................... 701/70, 72, 78, 701/82, 89, 90, 41, 74; 303/146, 139, 140; 180/197

(56) References Cited

U.S. PATENT DOCUMENTS

| | | | |
|---|---|---|---|
| 4,834,205 | * 5/1989 | Mizuno et al. | 180/141 |
| 5,063,514 | * 11/1991 | Headley et al. | 364/426.02 |
| 5,172,961 | * 12/1992 | Inoue et al. | 303/100 |
| 5,229,944 | * 7/1993 | Yasuno | 364/426.01 |
| 5,275,475 | * 1/1994 | Hartmann et al. | 303/103 |
| 5,311,431 | * 5/1994 | Cao et al. | 364/424.05 |
| 5,333,058 | * 7/1994 | Shiraihi et al. | 701/41 |
| 5,341,297 | * 8/1994 | Zomotor et al. | 364/426.03 |
| 5,366,281 | * 11/1994 | Littlejohn | 303/188 |
| 5,402,342 | * 3/1995 | Ehret et al. | 364/424.05 |

(List continued on next page.)

FOREIGN PATENT DOCUMENTS

| | | |
|---|---|---|
| 41 23 235 C1 | * 11/1992 | (DE). |
| 41 21 954 A1 | * 1/1993 | (DE). |
| 42 00 061 A1 | * 7/1993 | (DE). |
| 42 23 385 A1 | * 1/1994 | (DE). |
| 42 29 504 A1 | * 3/1994 | (DE). |

(List continued on next page.)

OTHER PUBLICATIONS

May the Cornering Force be With You; Popular Mechanics; Dec. 1995; pp. 74–77.
Stable as She Goes: Don Sherman, Automotive Industries, May 1995.
The Spin Doctors: Don Sherman, 12PS95 (month and year are not available).
Mercedes/Bosch ESP; Automotive Industries, Apr. 1995.
Controlling Vehicle Stability; Christopher A. Sawyer, Automotive Industries, Jan. 1995.
Let Magic Fingers Do the Driving: Wards Auto World; May 1995.
Technoid: Intelligent Brakes are on the Way; Car and Driver, Aug. 1994.
Toyota Vehicle Stability Control System; Automotive Engineering, Aug. 1995.
Vehicle Dynamics Offers New Level of Safety: Machine Design, Sep. 1994.
Handling Control Systems for Your Car: Popular Electronics; Feb. 1995.

(List continued on next page.)

*Primary Examiner*—Tan Nguyen
(74) *Attorney, Agent, or Firm*—Anthony Luke Simon

(57) ABSTRACT

An improved vehicle active brake control based on an estimate of vehicle yaw rate, wherein the estimate is based on the speeds of the un-driven wheels, but compensated to reflect slipping of the un-driven wheels during braking. Prior to braking, the yaw rate is estimated solely on the basis of the measured speeds of the un-driven wheels. During braking, the slip speeds of the un-driven wheels are estimated based on the measured speeds, the reference speed of the vehicle and the previous estimate of yaw rate, and used to compute a new yaw rate that is compensated for the estimated slip speeds.

4 Claims, 4 Drawing Sheets

U.S. PATENT DOCUMENTS

| | | | |
|---|---|---|---|
| 5,444,621 | * | 8/1995 | Matsunaga et al. ............. 364/424.05 |
| 5,480,219 | * | 1/1996 | Kost et al. ............................ 303/146 |
| 5,720,533 | * | 2/1998 | Pastor et al. ......................... 303/147 |
| 5,746,486 | * | 5/1998 | Paul et al. ............................ 303/146 |
| 5,839,799 | * | 11/1998 | Fukada ................................. 303/146 |

FOREIGN PATENT DOCUMENTS

| | | | | |
|---|---|---|---|---|
| 43 11 077 A1 | * | 10/1994 | (DE) . | |
| 43 14 827 A1 | * | 11/1994 | (DE) . | |
| 0 555 860 A1 | * | 8/1993 | (EP) . | |
| 2 275 551 | * | 1/1993 | (GB) . | |
| 2 263 340 | * | 7/1993 | (GB) . | |
| 2 269 571 | * | 2/1994 | (GB) . | |
| 2 275 312 | * | 8/1994 | (GB) . | |
| 40 52 62213 | * | 10/1993 | (JP) ................................. | B60T/8/32 |
| 40 60 24304 | * | 2/1994 | (JP) ................................. | B60T 8/24 |
| 40 60 87421 | * | 3/1994 | (JP) ................................. | B60T 8/32 |
| 40 61 15418 | * | 4/1994 | (JP) ................................. | B60T 8/24 |
| 40 61 27354 | * | 5/1994 | (JP) ................................. | B60T 8/24 |

OTHER PUBLICATIONS

VDC, the Vehicle Dynamics Control System of Bosch: A. VanZanten, R. Erhardt and G. Pfaff; Robert Bosch GmbH; No. 950759, pp. 9–26 (month and year are not available).

Active Stability Control; Junichi Kubokawa, Aisin Seiki Co., Ltd., Electronics & Brake Division; Abstract; Sep. 1995.

Consideration of Lateral and Longitudinal Vehicle Stability by Function Enhanced Brake and Stability Control System; Heinz Leffler; SAE #940832; Feb. 28–Mar. 3, 1994.

Control of Vehicle Dynamics: Automotive Engineering; pp. 87–93, May 1995.

Improvement of Vehicle Maneuverability by Direct Yaw Moment Control; Y. Shibahata, K. Shimada and T. Tomari; Society of Automotive Engineers of Japan, Inc.; pp. 464–481 (month and year are not available).

Spin Control for Cars; Steven Ashley; Mechanical Engineering; pp. 66–68; Jun. 1995.

* cited by examiner

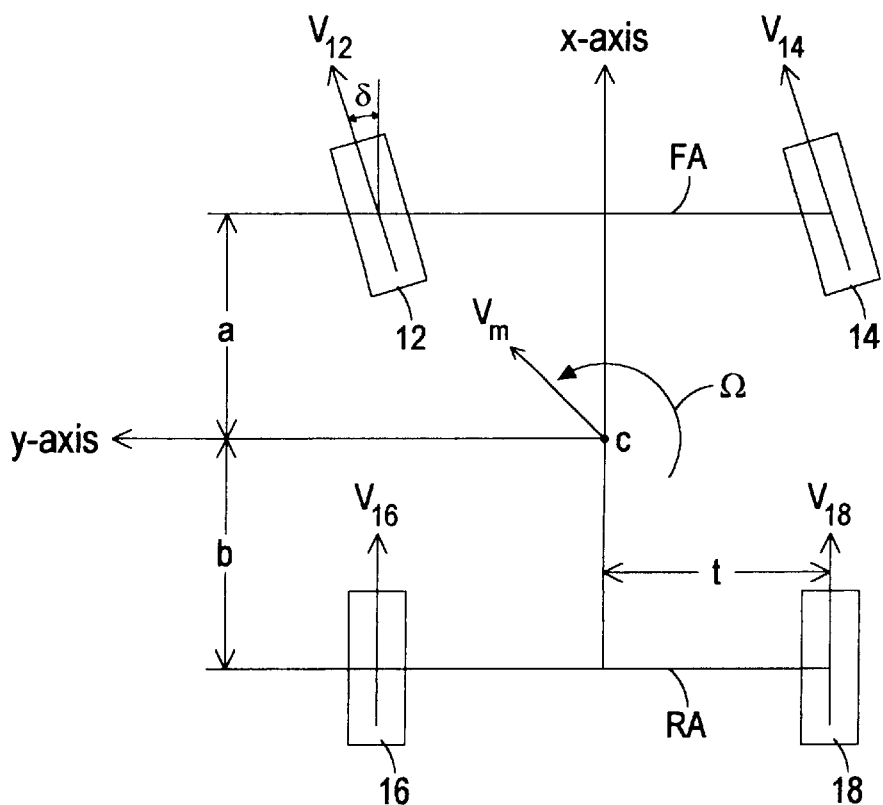
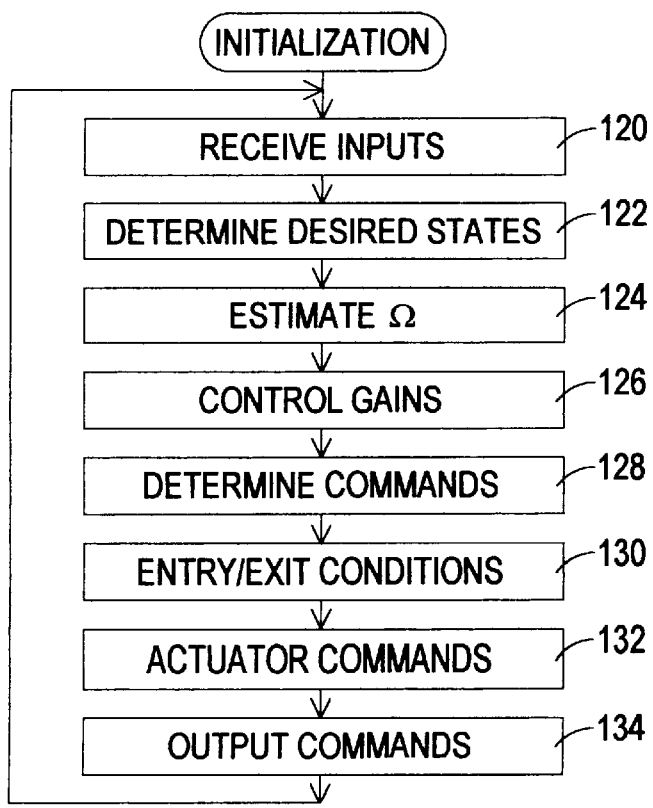
FIGURE 2
FIGURE 3

US 6,169,951 B1

ACTIVE BRAKE CONTROL HAVING YAW RATE ESTIMATION

FIELD OF THE INVENTION

This invention relates to a vehicle active brake control in which differential braking is used to impart a yaw moment, and more particularly to a control based on an estimate of the vehicle yaw rate.

BACKGROUND OF THE INVENTION

Recently, vehicles have been produced with brake systems that can actively brake individual wheels in an effort to improve vehicle stability or handling near and at the limit of adhesion. These systems usually seek to bring the vehicle as closely as possible to a desired path and/or to minimize the lateral movement of the tires relative to the road surface. Typically, the control is configured to bring the vehicle yaw rate into correspondence with a desired yaw rate value.

Because the price of yaw rate sensors is still relatively high, active controls of the type described above are necessarily limited to a small number of vehicles. While the vehicle yaw rate can be estimated based on measured speeds of the un-driven wheels, the estimates often fail to faithfully track the actual vehicle yaw, particularly during braking when the un-driven wheels begin to slip. What is desired is an active brake control that does not require a yaw sensor, but that can reliably estimate and control yaw even during conditions that degrade the validity of a wheel speed based estimate of yaw rate.

SUMMARY OF THE PRESENT INVENTION

The present invention is directed to an improved vehicle active brake control based on an estimate of vehicle yaw rate, wherein the estimate is based on the speeds of the un-driven wheels, but compensated to reflect slipping of the un-driven wheels during braking. Prior to braking, the yaw rate is estimated solely on the basis of the measured speeds of the un-driven wheels. During braking, the slip speeds of the un-driven wheels are estimated based on the reference speed of the vehicle and the previous estimate of yaw rate, and used to compute a new yaw rate that is compensated for the estimated slip speeds.

BRIEF DESCRIPTION OF THE DRAWINGS

The present invention will now be described by way of example with reference to the following drawings, in which:

FIG. 2 is a vector diagram of important kinematic variables of the vehicle;

FIG. 3 is a main flow diagram executed be the controller of FIG. 1 for carrying out an active brake control according to this invention;

DETAILED DESCRIPTION OF THE INVENTION

Figure 1:
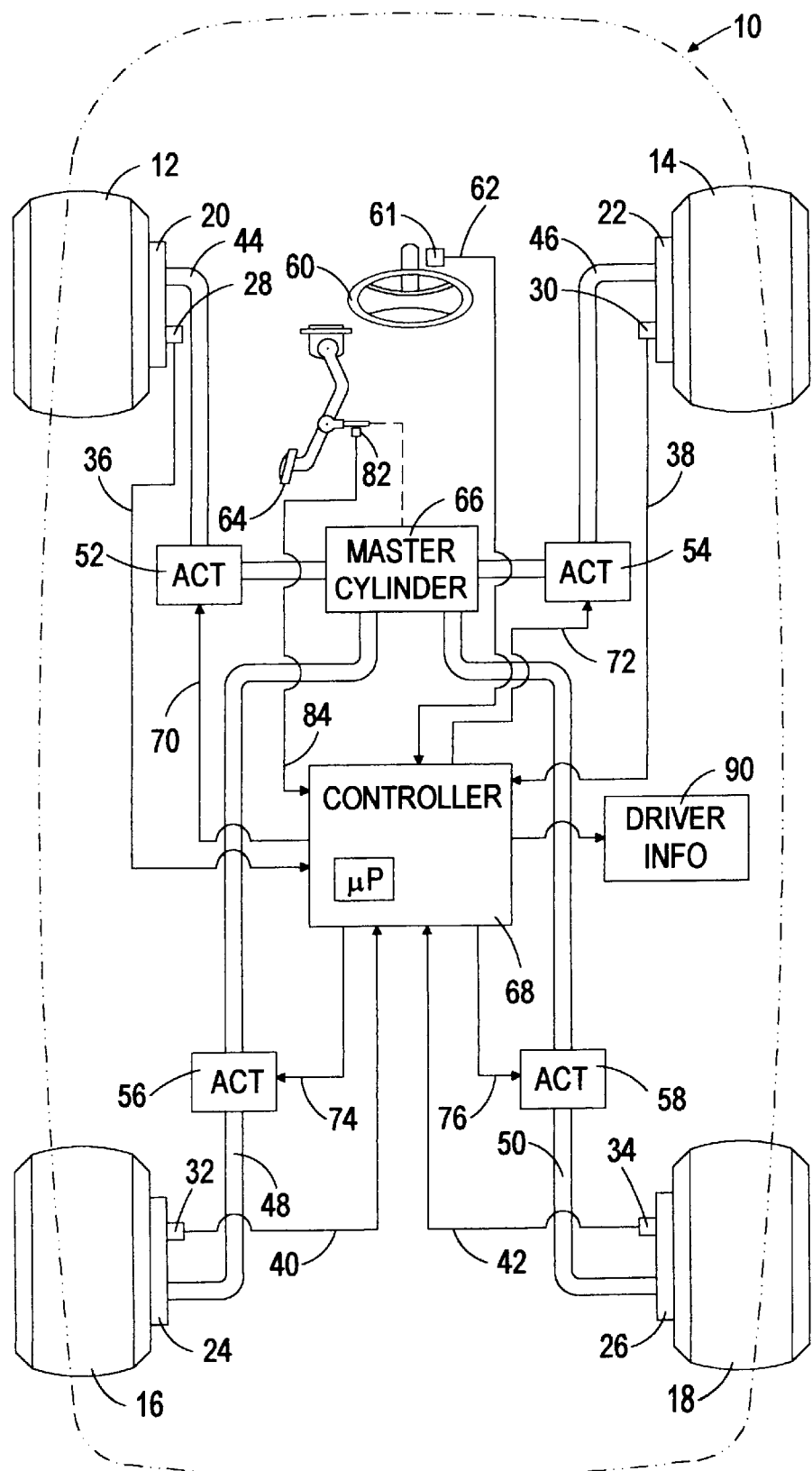
FIG. 1 is a diagram of vehicle having an active brake control implemented by an electronic controller in accordance with this invention.

FIG. 1 depicts a mechanization of a brake control according to this invention on a vehicle 10. The vehicle 10 includes a brake system having a micro-processor based controller 68 for controlling the brakes 20, 22, 24, 26 of the respective wheels 12, 14, 16, 18. The controller 68 receives various inputs, including wheel speed signals on lines 36, 38, 40, 42 from respective wheel speed sensors 28, 30, 32, 34; a brake pedal travel signal on line 83 from pedal travel sensor 82; and a steering wheel angle signal on line 62 from angle sensor 61. The sensors 28, 30, 32, 34, 61 may be implemented with conventional devices in a manner known to those skilled in the art.

Under certain conditions such as wheel lock-up or spinning, the controller 68 modifies the normal braking of one or more of the wheels 12, 14, 16, 18 via the respective actuators 52, 54, 56, 58 in order to restore a desired overall operation of the vehicle. Under conditions of lateral instability, the controller 68 commands one or more of the respective actuator(s) 52, 54 to selectively increase or decrease the brake forces generated at the left and/or right front wheels 12, 14 to bring the vehicle yaw rate and slip angle into conformance with the desired yaw rate. Exemplary actuators are shown and described in detail in the U.S. Pat. No. 5,366,291, assigned to the assignee of the present invention.

FIG. 2 is a schematic diagram of vehicle 10 during a turning maneuver, illustrating the concepts of yaw rate, reference speed and forward wheel velocity. The longitudinal axis of vehicle is defined as the x-axis, and the lateral axis of the vehicle is defined as the y-axis. The vehicle center of gravity C is located on the x-axis, at a distance "a" from the front axle FA, and a distance "b" from the rear axle RA. The track "t" is defined as the distance from the x-axis to the center of any of the wheels 12, 14, 16, 18. In the diagram, the front wheels 12, 14 are turned at a steering angle δ with respect to the x-axis, producing a yaw rate Ω in the counter-clockwise direction. The vector $V_m$ represents the true velocity of the vehicle center of gravity C, and is referred to herein as the reference velocity of the vehicle. Typically, vehicle control systems such as anti-lock brake systems compute the reference velocity $V_m$ according to the average of the individual wheel speeds in the absence of significant braking, and then estimate the reference speed based on the wheel acceleration observed when the anti-lock brake system is active. Otherwise, the reference speed $V_m$ can be directly measured, for example, with an on-board radar speed sensor. The individual wheels 12, 14, 16, 18 also have a forward velocity, designated as $V_{12}$, $V_{14}$, $V_{16}$ and $V_{18}$. These forward velocities are related to the reference velocity $V_m$ and the yaw rate Ω as follows:

$$V_{12} = V_m + t\Omega \tag{1}$$

$$V_{14} = V_m - t\Omega \tag{2}$$

$$V_{16} = V_m + t\Omega \tag{3}$$

$$V_{18} = V_m - t\Omega \tag{4}$$

Finally, each wheel "i" can have a slip speed $\lambda_i$, defined as a function of its forward speed $V_i$, the wheel radius "$r_i$" and its measured rotational speed $\omega_i$ as follows:

$$\lambda_i = (V_i - r_i \omega_i)/V_i \tag{5}$$

During vehicle operation, one can distinguish two kinds of vehicle handling behavior. The first kind of behavior (linear) occurs during driving well within the limit of adhesion where tire cornering characteristics remain within the linear range of operation. That is, cornering forces developed between the tires and the road surface remain proportional to the tire slip angles; consequently, at a given speed, the yaw rate remains approximately proportional to the steering angle, with only small delay, barely perceptible by the driver. The second kind of behavior (non-linear) occurs when the vehicle approaches the physical limit of adhesion, and the tire forces no longer increase proportionally to the slip angles, and may saturate. At this point the tire slip angles, and consequently also the vehicle slip angle, may increase quite rapidly without corresponding increase in lateral forces. In this nonlinear range of operation vehicle motion is characterized by significant lateral movement of at least some of the vehicle tires with respect to the road surface. The vehicle becomes less responsive to the driver steering inputs, and vehicle behavior is less predictable.

Since the experience of most drivers is limited to driving well within the linear range of vehicle handling behavior, stability enhancement systems usually seek to reduce the difference between the normal vehicle behavior and that at the limit, in order to improve chances of a typical driver to maintain control of vehicle in emergency situations. This can be accomplished by reducing the deviation of the vehicle yaw rate and slip angle from the desired yaw rate and slip angle during nonlinear operating conditions by active brake control. An example of such a control is set forth in the U.S. patent application Ser. No. 08/967,091, assigned to the assignee of the present invention.

Advantageously, the control of the present invention obviates the need for a yaw sensor by estimating the vehicle yaw rate using measurements of the speeds of the un-driven wheels and the vehicle reference speed. In the illustrated embodiment, it is assumed that the vehicle 10 has front wheel drive and that differential braking is only applied to the front wheels 12, 14, as indicated above in reference to FIG. 1.

Under both linear and non-linear conditions, the yaw rate $\Omega$ can be expressed without approximation as a function of the forward speeds $V_{16}$, $V_{18}$ of the un-driven wheels 16, 18 and the vehicle track "t" by combining expressions (3) and (4) and solving for $\Omega$. In other words, the true yaw rate $\Omega_{true}$ is given by:

$$\Omega_{true} = (V_{16} - V_{18})/2t \tag{6}$$

However, the forward speeds $V_{16}$, $V_{18}$ are difficult to directly determine, and the yaw rate may be estimated in term of the measurable speed and radius parameters $\Omega_{16}$, $\Omega_{18}$ and $r_{16}$, $r_{18}$ as follows:

$$\Omega_{est} = (\omega_{16} r_{16} - \omega_{18} r_{18})/2t \tag{7}$$

Figure 5:
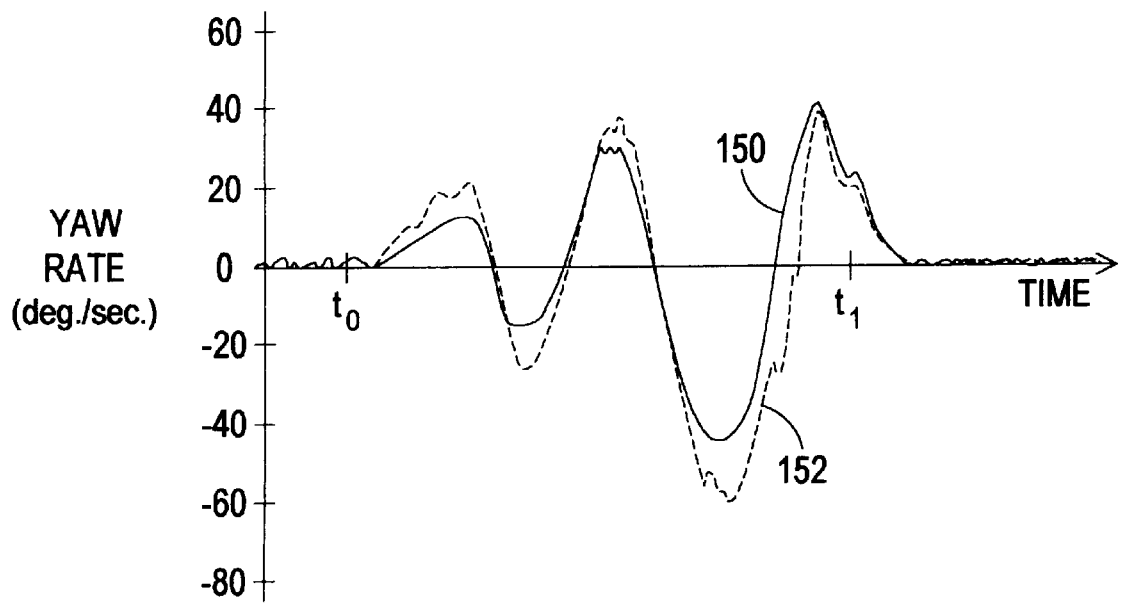
FIG. 5 is a graph depicting measured yaw rate and wheel-speed based estimate of yaw rate as a function of time for a vehicle braking maneuver on snow.

Under linear conditions with the slip speeds $\lambda_{16}$ and $\lambda_{18}$ are equal to zero, the estimated yaw rate $\Omega_{est}$ is equivalent to the true yaw rate $\Omega_{true}$. However, under non-linear conditions with non-zero slip speeds $\lambda_{16}$ and $\lambda_{18}$, the result of equation (7) deviates from the true yaw rate $\Omega_{true}$; see FIG. 5, discussed below. The wheel slip contribution to the yaw rate $\Omega$ can be expressed by solving equation (5) for $r_i \omega_i$ (for both un-driven wheels 16, 18), and substituting the result into equation (7), yielding:

$$\Omega_{est} = [V_{16}(1-\lambda_{16}) - V_{18}(1-\lambda_{18})]/2t \tag{8}$$

Expanding and combining equation (8) yields:

$$\Omega_{est} = (V_{16} - V_{18})/2t - [(V_{16}\lambda_{16}) - V_{18}\lambda_{18})]/2t \tag{9}$$

or simply:

$$\Omega_{est} = \Omega_{true} - [(V_{16}\lambda_{16}) - V_{18}\lambda_{18})]/2t \tag{10}$$

Combining equations (3), (4) and (18) and solving for $\Omega_{true}$ yields an equation for $\Omega_{true}$ in terms of $\Omega_{est}$, reference speed $V_m$, track "t", and slip speeds $\lambda_{16}$ and $\lambda_{18}$ as follows:

$$\Omega_{true} = \frac{\Omega_{est} + [V_m(\lambda_{16} - \lambda_{18})]/2t}{1 - (\lambda_{16} + \lambda_{18})/2} \tag{11}$$

Since $\lambda_{16}$ and $\lambda_{18}$ are difficult to compute without foreknowledge of the yaw rate $\Omega$ or forward wheel velocities $V_{16}$ and $V_{18}$, the wheel slips $\lambda_{16}$ and $\lambda_{18}$ may be computed approximately from equations (3), (4) and (5) in an iterative control loop by setting $\Omega$ equal to the yaw rate estimate from the previous control loop. Of course, prior to braking, the yaw rate $\Omega$ may be obtained from equation (7).

Thus, according to the invention, the yaw rate $\Omega$ is obtained during non-braking operation using equation (7), and during braking operation, by substituting the last value of $\Omega$ into equations (3) and (4) to obtain estimates of $V_{16}$ and $V_{18}$, solving equation (5) for $\lambda_{16}$ and $\lambda_{18}$ using the estimated values of $V_{16}$ and $V_{18}$, and finally, solving equation (11) for $\Omega_{true}$ using the estimated values of $\lambda_{16}$ and $\lambda_{18}$. In other words, if $\Delta T$ is the control sample time, $\lambda_{16}$ and $\lambda_{18}$ are estimated as:

$$\lambda_{16} = (V_m + t\Omega(t-\Delta T) - r_{16}\omega_{16})/(V_m + t\Omega(t-\Delta T)) \tag{12}$$

$$\lambda_{18} = (V_m - t\Omega(t-\Delta T) - r_{18}\omega_{18})/(V_m - t\Omega(t-\Delta T)) \tag{13}$$

and the yaw rate $\Omega$ is estimated as:

$$\Omega_{est} = \frac{\Omega_{est}(t-\Delta T) + [V_m(\lambda_{16} - \lambda_{18})]/2t}{1 - (\lambda_{16} + \lambda_{18})/2} \tag{14}$$

A main flow diagram for an active brake control according to this invention is set forth in FIG. 3. At block 120, inputs from the various sensors depicted in FIG. 1 are read and processed to form parameters useful in connection with the estimation of yaw rate. For example, the input signals are filtered, wheel speeds are used to determine vehicle speed $V_x$, and the vehicle reference velocity $V_m$ is computed or obtained from the vehicle anti-lock brake system. Block 122 is then executed to determine the desired vehicle states, such as the desired yaw rate $\Omega_d$. This can be achieved using a vehicle reference model such as described in the aforementioned U.S. Ser. No. 08/967,091. The block 124 is then executed to determine an estimated vehicle yaw rate $\Omega_{est}$, as described in further detail in the flow diagram of FIG. 4. Blocks 126 and 128 are then executed to determine the control gains and a closed-loop corrective moment command $\Delta M$ for reducing a detected error between the desired and estimated yaw rate values. The exit and enter conditions are established at block 130, and the actuator commands are determined and applied to the actuators at blocks 132 and 134.

Figure 4:
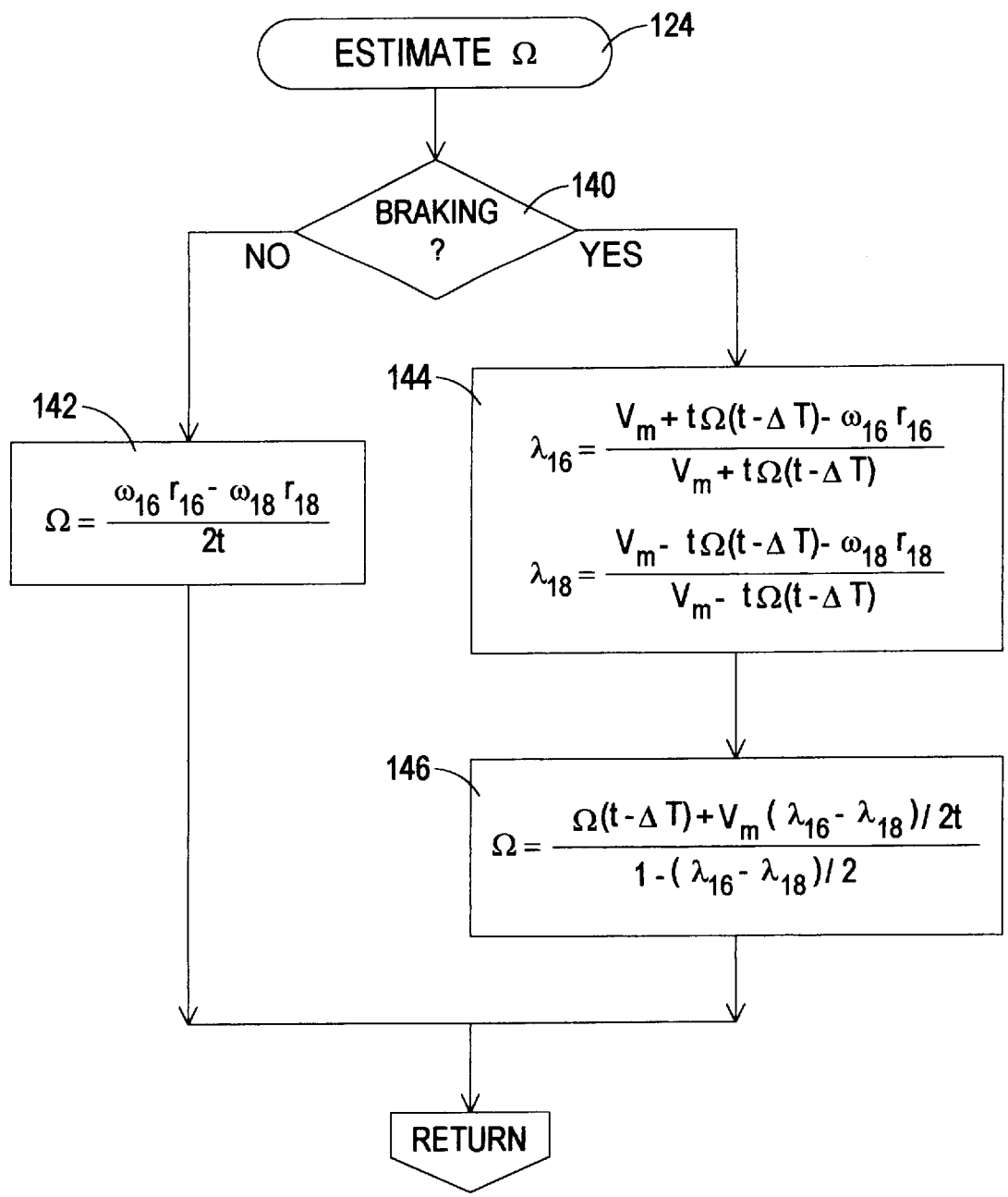
FIG. 4 is flow diagram for estimating yaw rate according to this invention.

Referring to FIG. 4, the estimation of the yaw rate $\Omega$ according to this invention first involves determining if there is significant driver braking, as indicated at block 140. This may be determined by a sensor such as pedal travel sensor 82, or may be inferred when the vehicle deceleration exceeds a calibrated threshold. If block 140 is answered in the negative, block 142 is executed to compute the yaw rate $\Omega$ as a function of measured wheel speeds $\omega_{16}$ and $\omega_{18}$, the tire radii $r_{16}$ and $r_{18}$, and the vehicle track t, using equation (7). If block 140 is answered in the affirmative, some non-zero wheel slip is assumed, and the estimation of block 142 fails to reliably track the actual yaw rate. This is graphically illustrated in FIG. 5, in which traces 150 and 152 respectively show the actual yaw rate and the yaw rate computed according to equation (7) during a vehicle steering maneuver while braking on snow. The brakes are applied at time $t_0$, and then released at time $t_1$. Prior to time $t_0$ and after time $t_1$, the computed yaw rate of broken trace 152 faithfully tracks the actual yaw rate of solid trace 150, but significantly deviates from the actual yaw rate during braking.

Figure 6:
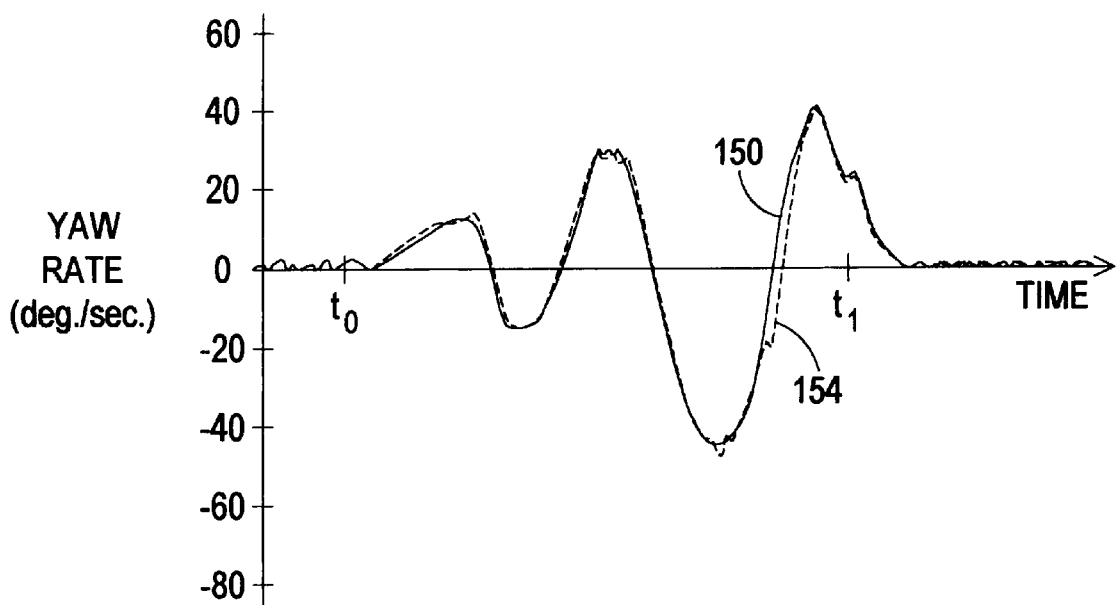
FIG. 6 is a graph depicting measured yaw rate and the slip-compensated wheel-speed based estimate of yaw rate as a function of time for a vehicle braking maneuver on snow.

Thus, referring back to FIG. 4, the control of this invention develops a compensated yaw rate estimate during braking by using the vehicle reference speed $V_m$ and the previously computed yaw rate value $\Omega(t-\Delta T)$ to estimate the rear wheel slip speeds $\lambda_{16}$ and $\lambda_{18}$, and in turn, a new yaw rate value, as shown at blocks 144 and 146, respectively. The compensated yaw rate value is depicted in FIG. 6 by the broken trace 154, which tracks the actual yaw rate (solid trace 150) much more faithfully than the wheel-speed based estimate (trace 152 of FIG. 5).

In summary, this invention provides an active brake control that does not require a yaw sensor, but that can reliably estimate and control yaw even during conditions that degrade the validity of an estimated or computed yaw value. While described in reference to the illustrated embodiment, it is expected that various modifications will occur to those skilled in the art, and that controls incorporating such modifications may fall within the scope of this invention, which is defined by the appended claims.

The embodiments of the invention in which an exclusive property or privilege is claimed are defined as follows:

1. A method of estimating vehicle yaw rate in a vehicle stability enhancement control configured to produce a corrective vehicle yaw moment based on a deviation of the vehicle yaw rate from a desired value, where the vehicle has a pair of un-driven wheels subject to wheel slip during driver braking of the vehicle, and a reference velocity corresponding to an instantaneous velocity of a center of gravity of the vehicle, the method comprising the steps of:

measuring speeds of the un-driven wheels of the vehicle;

estimating the vehicle yaw rate according to a first method based on a difference between the measured wheel speeds;

detecting driver braking of the vehicle; and during driver braking, estimating the vehicle yaw rate according to a second method that compensates for wheel slip of the un-driven wheels, based on the measured wheel speeds, the vehicle reference velocity, and a previous estimate of the vehicle yaw rate.

2. The method of claim 1, wherein the step of estimating the vehicle yaw rate according to the second method includes the steps of:

estimating slip speeds of the un-driven wheels based on their measured speeds, the vehicle reference velocity, and the previous vehicle yaw rate estimate; and estimating a new yaw rate value based on the estimated slip speeds, the vehicle reference velocity, and the previous vehicle yaw rate estimate.

3. The method of claim 2, wherein the step of estimating slip speeds includes the steps of:

estimating the slip speed $\lambda_1$ of a first of the un-driven wheels in accordance with the expression $(V_m+t\Omega(t-\Delta T)-r_1\omega_1)/(V_m+t\Omega(t-\Delta T))$, where $V_m$ is the vehicle reference velocity, t is a vehicle track dimension, $\Omega(t-\Delta T)$ is the previous vehicle yaw rate estimate, $r_1$ is the radius of the first un-driven wheel, and $\omega_1$ is the measured speed of the first un-driven wheel; and estimating the slip speed $\lambda_2$ of a second of the un-driven wheels in accordance with the expression $(V_m-t\Omega(t-\Delta T)-r_2\omega_2)/(V_m-t\Omega(t-\Delta T))$, where $r_2$ is the radius of the second un-driven wheel, and $\omega_2$ is the measured speed of the second un-driven wheel.

4. The method of claim 2, wherein the new yaw rate value is estimated in accordance with the expression $$\frac{\Omega(t-\Delta T)+[V_m(\lambda_1-\lambda_2)]/2t}{1-(\lambda_1+\lambda_2)/2}$$

where $\Omega(t-\Delta T)$ is the previous vehicle yaw rate estimate, $V_m$ is the vehicle reference velocity, $\lambda_1$ and $\lambda_2$ are the estimated slip speeds of the first and second un-driven wheels, respectively, and t is a vehicle track dimension.

* * * * *